United States Patent
Celasun et al.

(10) Patent No.: US 11,535,524 B2
(45) Date of Patent: *Dec. 27, 2022

(54) LITHIATED MATERIAL

(71) Applicant: COMMISSARIAT A L'ENERGIE ATOMIQUE ET AUX ENERGIES ALTERNATIVES, Paris (FR)

(72) Inventors: Yagmur Celasun, Grenoble (FR); Jean-Francois Colin, Grenoble (FR); Sebastien Martinet, Grenoble (FR); David Peralta, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 604 days.

This patent is subject to a terminal disclaimer.

(21) Appl. No.: 16/575,436

(22) Filed: Sep. 19, 2019

(65) Prior Publication Data
US 2020/0087159 A1  Mar. 19, 2020

(30) Foreign Application Priority Data
Sep. 19, 2018 (FR) .................... 18 58478

(51) Int. Cl.
C01G 23/00 (2006.01)
B22F 9/04 (2006.01)
H01M 4/485 (2010.01)
H01M 4/58 (2010.01)
H01M 10/0525 (2010.01)

(52) U.S. Cl.
CPC .......... C01G 23/002 (2013.01); B22F 9/04 (2013.01); H01M 4/485 (2013.01); H01M 4/5815 (2013.01); H01M 10/0525 (2013.01); B22F 2009/042 (2013.01); B22F 2301/054 (2013.01); B22F 2302/45 (2013.01); C01P 2002/30 (2013.01); C01P 2002/72 (2013.01)

(58) Field of Classification Search
CPC .... C01G 23/002; B22F 9/04; B22F 2009/042; B22F 2301/054; B22F 2302/45; H01M 4/485; H01M 4/5815; H01M 10/0525; C01P 2002/30; C01P 2002/72; Y02E 60/10
See application file for complete search history.

(56) References Cited

U.S. PATENT DOCUMENTS 4,194,062 A  3/1980 Carides et al.
2016/0285097 A1* 9/2016 Sakuda ............... C01G 23/002

FOREIGN PATENT DOCUMENTS

EP  2 977 354 A1  1/2016
GB  2 026 762 A   2/1980

OTHER PUBLICATIONS

U.S. Appl. No. 16/575,436, filed Sep. 19, 2019, Yagmur Celasun, et al.

(Continued)

Primary Examiner — Andrew J. Oyer
(74) Attorney, Agent, or Firm — Oblon, McClelland, Maier & Neustadt, L.L.P.

(57) ABSTRACT

A material of formula $Li_aTi_b(A_xS_{3-x})_c$ wherein A is a metalloid element chosen from selenium, tellurium and mixtures thereof, and the stoichiometric coefficients a, b, c and x are such that
$0<x<2.2$;
$0.4 \leq a \leq 4.5$;
$0.9 \leq b \leq 1.1$; and
$0.9 \leq c \leq 1.1$.

24 Claims, 4 Drawing Sheets

(56) References Cited

OTHER PUBLICATIONS

Figure 1:
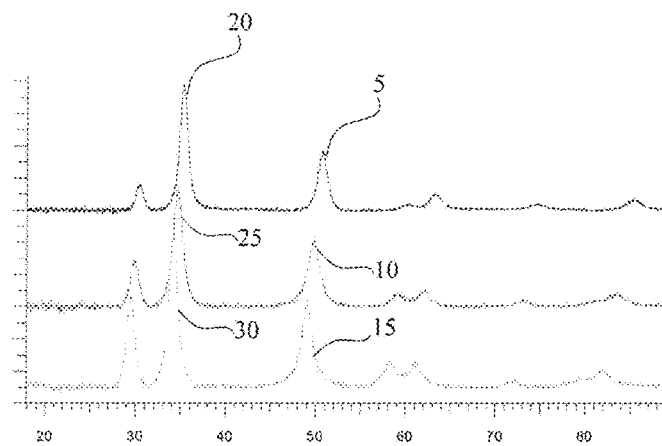

U.S. Appl. No. 16/575,443, filed Sep. 19, 2019, Yagmur Celasun, et al.

French Preliminary Search Report dated May 10, 2019 in French Application 18 58478, filed on Sep. 19, 2018 (with English Translation of Categories of Cited Documents).

* cited by examiner

LITHIATED MATERIAL

The present invention relates to a material based on lithium, titanium, sulfur and selenium intended to constitute, at least partly, a battery cathode.

Sulfur-based cathodes have a great potential for lithium-ion battery applications. Lithium titanium sulfide, of formula $Li_2TiS_3$, known in particular from EP 2 977 354 A1 and from the article by A. Sakuda et al., "*Rock-salt-type lithium metal sulphide as novel positive-electrode materials*", Sci. Rep., vol. 4, 4883 (2014), has a high reversible capacity, that may reach 400 mAh/g owing to multielectron redox reactions.

However, the reversible capacity of a lithium-ion battery comprising an $Li_2TiS_3$ cathode decreases rapidly when the number of charge/discharge cycles increases. In particular, after 10 cycles, the reversible capacity reaches only 80% of the maximum value generally reached in the first cycle. Lithium titanium sulfide therefore has an unstable charge/discharge behavior.

This behavior may be explained by a phenomenon of redox activity of the sulfur during the first charge. In a lithium-ion battery comprising a cathode made of lithium titanium sulfide, lithium ions are introduced into or extracted from the cathode during the charge/discharge cycles. In order to maintain the electric charge balance, one element must be oxidized and another element must be reduced. Such elements form a "redox couple". However, during the first charge, the titanium contained in the lithium titanium sulfide is not available to form a redox couple so as to compensate for the charge imbalance resulting from the extraction of the lithium from the cathode. Indeed, the structure of the lithium titanium sulfide is stabilized by $Ti^{4+}$ ions, which have the highest valence state of titanium. The titanium cannot therefore be oxidized. Consequently, only the sulfur is available during the first charge to balance the electric charge.

During the subsequent charges, the phenomenon described above disappears, the reversible capacity of the lithium titanium sulfide then stemming from the redox activity of the titanium. However, it is furthermore observed that the lithium titanium sulfide is gradually degraded and loses a portion of the activity of the sulfur that it comprises, as the number of charge/discharge cycles increases. The structure is then modified, which also contributes to the instability of the charge/discharge behavior of the lithium titanium sulfide.

The instability of the charge/discharge behavior described above represents an impediment to the industrialization of lithium-ion batteries containing lithium titanium sulfide.

A user of a device powered by a rechargeable battery in fact expects the reversible capacity of the battery not to decrease, or not to decrease much, with an increase in the number of charge/discharge cycles.

There is therefore a need for a material that does not exhibit the aforementioned drawback.

The invention aims to meet this need, and proposes a material of formula $Li_aTi_b(A_xS_{3-x})_c$ wherein A is a metalloid element chosen from selenium, tellurium and mixtures thereof, and the stoichiometric coefficients a, b, c and x are such that 0<x<2.2;
 0.4≤a≤4.5;
 0.9≤b≤1.1; and
 0.9≤c≤1.1.

The material according to the invention may have a reversible capacity lower than that of lithium titanium sulfide. However, within a battery, it has a reversible capacity that decreases relatively more slowly, with an increase in the number of charge/discharge cycles, than that of lithium titanium sulfide. It therefore proves to have a more stable charge/discharge behavior than the material of formula $Li_2TiS_3$.

Without being tied to any one theory, the inventors attribute the better stability of the material according to the invention to the high electronic conductivity of the metalloid element. Furthermore, the metalloid element has a larger ionic radius than sulfur. It is to the inventors' credit to have succeeded in introducing the metalloid element into the compact structure of the material according to the invention. One atom of the metalloid element occupies more space therein than a sulfur atom.

Preferably, the metalloid element A is selenium Se. Selenium has an electronic conductivity twenty times higher than that of sulfur.

The stoichiometric coefficient x may be less than or equal to 2.0, or even less than or equal to 1.5. Preferably, it is less than or equal to 1.2, or even preferably less than or equal to 1.1. Preferably, it is equal to 1. In a variant, it may be equal to 2.

The stoichiometric coefficient a may be greater than or equal to 1.0, or even greater than or equal to 1.2. Preferably, it is greater than or equal to 1.4, better still greater than or equal to 1.5. It may be less than or equal to 4.0, or even less than or equal to 3.0. Preferably, it is less than or equal to 2.5, or even less than or equal to 2.1, preferably less than or equal to 2.05.

Preferably, the stoichiometric coefficient a is equal to 2.

The stoichiometric coefficient b may be greater than or equal to 0.95 and/or less than or equal to 1.05. Preferably, it is equal to 1.

The stoichiometric coefficient c may be greater than or equal to 0.95 and/or less than or equal to 1.05. Preferably, it is equal to 1.

The stoichiometric coefficient a may be equal to 2 and/or the stoichiometric coefficient b may be equal to 1 and/or the stoichiometric coefficient c may be equal to 1.

Preferably, the material according to the invention is of formula $Li_aTi_bSe_xS_{3-x}$ with 1.5≤a≤2.05; 0.95≤b≤1.05 and preferably 0≤x≤1.2.

Preferably, the stoichiometric coefficient a is equal to 2, the stoichiometric coefficient b is equal to 1 and the stoichiometric coefficient c is equal to 1.

In other words, preferably, the material according to the invention is of formula $Li_2TiSe_xS_{3-x}$, preferably with x≤1.2. The material of formula $Li_2TiSe_xS_{3-x}$ preferably has the same structure as the material of formula $Li_2TiS_3$, in which sulfur ions are replaced by selenium ions.

Preferably, the material according to the invention is of formula $Li_2TiSeS_2$. It then has an optimal stability particularly suitable for forming a cathode of a battery, in particular of a lithium-ion battery.

The material according to the invention preferably has an NaCl-type crystallographic structure. Preferably, the lattice parameter of the NaCl-type structure is between 5.10 Å and 5.30 Å, preferably between 5.10 Å and 5.18 Å, for example equal to 5.16 Å. 1 Å corresponds to $10^{-10}$ m.

An "NaCl-type" crystallographic structure is a face-centered cubic structure having an Fm3̄m space group.

The material according to the invention preferably has a maximum reversible capacity of greater than 200 mAh·$g^{-1}$, or even of greater than 230 mAh·$g^{-1}$, expressed per gram of material according to the invention. The reversible capacity is measured between 1.8 V and 3.0 V vs $Li^+$/Li at a C/10 rate. A C/y rate corresponds to a charge carried out in y hours.

Furthermore, the invention relates to a powder comprising, or even consisting of, particles formed of the material according to the invention. The particles of the powder according to the invention may be of varied shape. For example, the particles are of spherical or platelet shape. The particles may have a size of between 20 nm and 5 µm, in particular less than 1 µm. The "size" of a particle is its largest dimension that can be seen on an image taken, for example using a scanning electron microscope, along a direction perpendicular to the plane on which said particle rests.

The particles may form agglomerates, having for example a size of the order of 30 µm.

Furthermore, the invention relates to a battery cathode comprising, or even consisting of the material according to the invention. The cathode may in particular comprise the powder according to the invention dispersed within a binder.

The invention also relates to a battery, chosen from a lithium battery and a lithium-ion battery, the battery comprising a cathode according to the invention. The battery may comprise an anode made of a material chosen from graphite, lithium or silicon or any other conversion material.

Preferably the battery is a lithium-ion battery. The maximum reversible capacity of the lithium-ion battery is greater than 200 mAh·g$^{-1}$, or even greater than 230 mAh·g$^{-1}$, expressed per gram of material according to the invention. The maximum reversible capacity of the lithium-ion battery is the maximum value of the capacity measured over a succession of the first 15 charge/discharge cycles of the battery, measured between 1.8 V and 3.0 V vs Li$^+$/Li at a C/10 rate. A C/y rate corresponds to a charge carried out in y hours. Furthermore, the capacity retention at fifteen cycles of the lithium-ion battery, corresponding to the ratio of the reversible capacity measured at the end of discharge at the fifteenth cycle to the reversible capacity measured at the end of discharge at the first cycle, is preferably greater than or equal to 75%, preferably greater than or equal to 85%, better still greater than or equal to 90%.

The invention lastly relates to a process for manufacturing a material according to the invention, comprising a step of milling raw materials, preferably in a wet environment in a solvent, the raw materials being chosen so as to obtain, at the end of the milling step, the material according to the invention.

Figure 2:
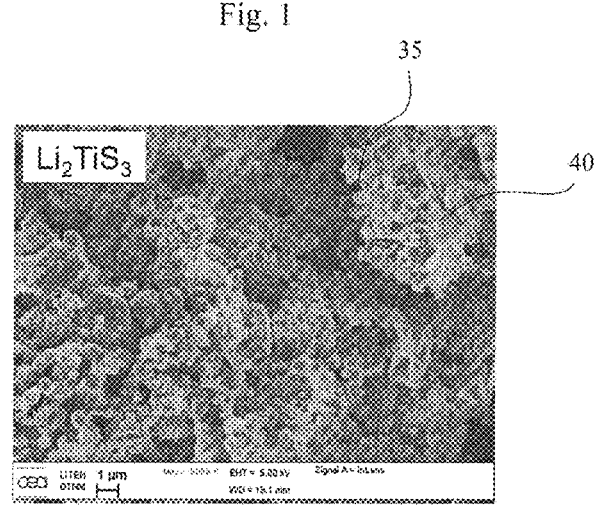
Figure 3:
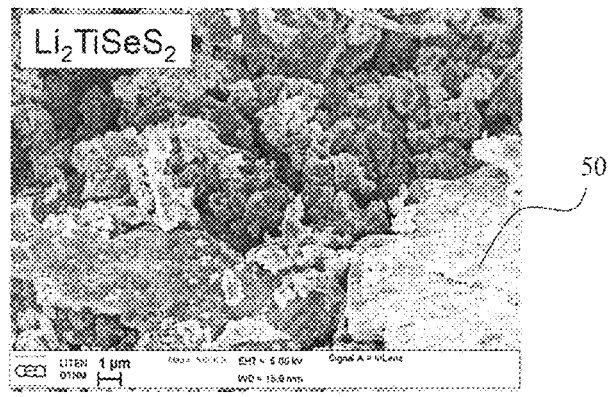
Figure 4:
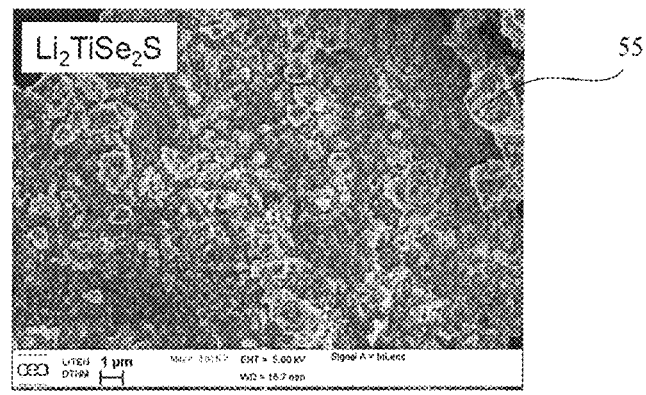
Figure 5:
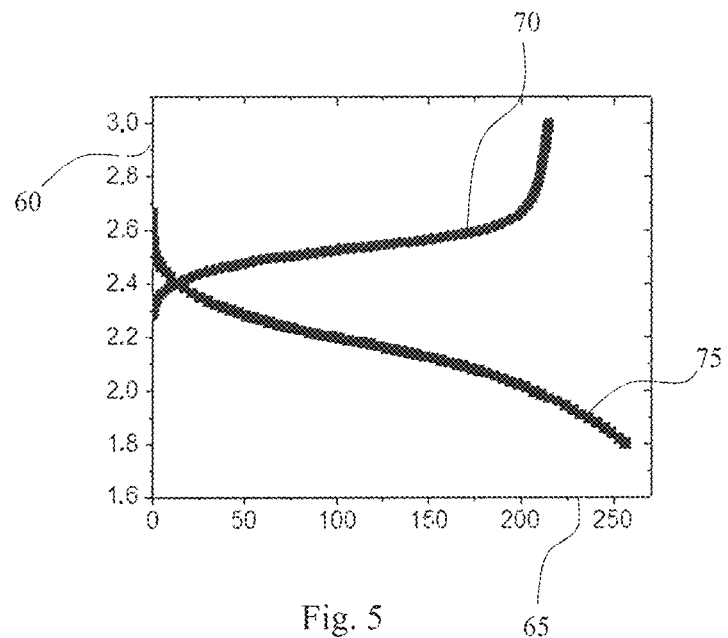
Figure 6:
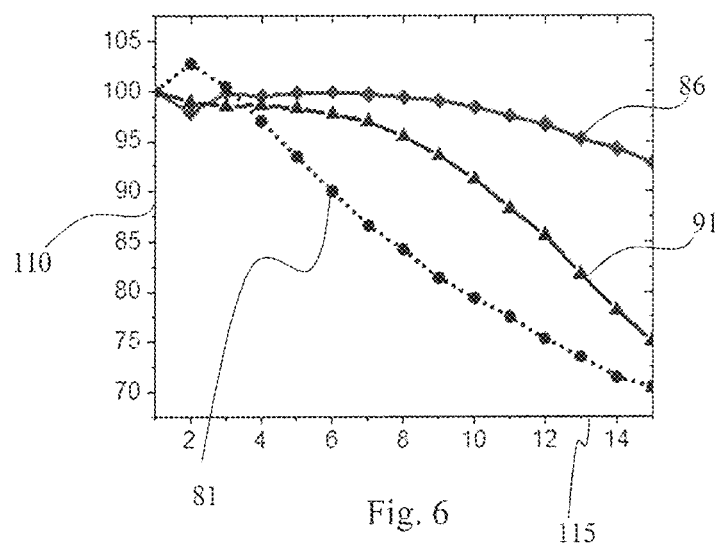
Figure 7:
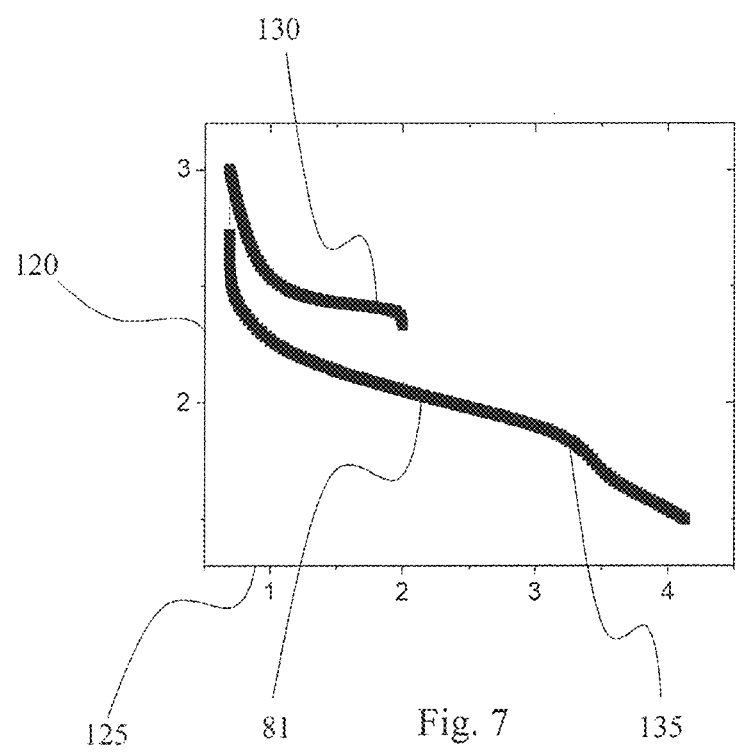

Other advantages of the invention will become apparent on reading the detailed description which follows, and by virtue of the appended drawing in which:

FIG. 1 contains diffractograms obtained by x-ray diffraction of materials of formula $Li_2TiS_3$, $Li_2TiSeS_2$ and $Li_2TiSe_2S$ in which the diffraction intensity, in arbitrary units, is expressed as a function of the 2θ diffraction angle, FIGS. 2 to 4 are photographs taken by scanning electron microscopy of materials of formula $Li_2TiS_3$, $Li_2TiSeS_2$ and $Li_2TiSe_2S$ respectively, FIG. 5 is a graph representing the evolution of the potential, in V vs Li+/Li, as a function of the capacity, in mAh/g, during the first charge/discharge cycle, of a battery comprising the material of formula $Li_2TiSeS_2$, FIG. 6 is a graph representing the evolution of the capacity retention of batteries comprising the material of formula $Li_2TiS_3$, $Li_2TiSeS_2$ and $Li_2TiSe_2S$ respectively, as a function of the number of charge/discharge cycles, and FIG. 7 is a graph representing the evolution of the potential, in V vs Li+/Li, as a function of the stoichiometric coefficient x of the lithium, of an example of material according to the invention.

In order to manufacture the material according to the invention, it is possible to carry out a step of milling raw materials, the raw materials being chosen so as to obtain, at the end of the milling step, the material according the invention.

A person skilled in the art knows how to adapt the amounts of each of the raw materials so as to obtain, at the end of the milling step, the material according to the invention.

The milling may be carried out in a wet environment in a solvent.

The solvent may be chosen from hexane, cyclohexane, a mixture of heptane, acetone and ethanol, and mixtures thereof. Preferably, the solvent is hexane, preferably having a purity of greater than 99.5%, preferably greater than 99.9%.

Preferably, during the milling, the raw materials are dispersed in the solvent.

The raw materials are preferably in the form of powders. They may comprise at least two sources each supplying at least one element chosen from lithium, sulfur, selenium and titanium.

Preferably, the raw materials comprise a powder of titanium particles comprising more than 95%, or even more than 99%, by weight of titanium, and a powder of selenium particles comprising more than 95%, or even more than 99%, by weight of selenium. They may comprise a powder of lithium sulfide particles. Preferably, they comprise a powder of lithium sulfide particles, a powder of titanium particles and a powder of selenium particles.

The median size of each of said powders may be between 44 µm and 74 µm.

The milling step is carried out within a mill, for example a planetary ball mill. The invention is not however limited to such a type of mill, any other mill conventionally used in the field of the invention being able to be used.

The raw materials may be poured into the mill, prior to or during the milling. They may be poured one after the other into the mill. As a variant, a particulate mixture may be formed by mixing together the raw materials prior to the milling step. If need be, the solvent may be introduced before, jointly with or after the introduction of the raw materials into the mill.

Preferably, the duration of the milling step is between 10 h and 50 h, preferably is between 20 h and 30 h. Furthermore, the milling step may be carried out at a temperature between 10° C. and 40° C., for example at ambient temperature.

In order to limit the corrosion of the raw materials and of the material being formed, the milling step is preferably carried out under a reducing or preferably inert atmosphere, for example under argon.

Preferably, the material obtained at the end of the milling step is in the form of a powder.

Where appropriate, the process may furthermore comprise a drying step successive to the milling step, so as to eliminate the solvent.

EXAMPLES

The following nonlimiting examples are given for the purpose of illustrating the invention.

The following raw materials are used to carry out the following examples:
  powder of $Li_2S$ lithium sulfide particles, sold under the reference 213241-10G by Sigma Aldrich,
  powder of titanium sulfide particles, sold under the reference 333492-10G by Sigma Aldrich, powder of titanium particles, sold under the reference 36679.14 by Alfa Aesar, powder of selenium particles, sold under the reference 36208.18 by Alfa Aesar.

Furthermore, the x-ray diffraction analyses were carried out using a Bruker® D8 Advance diffractometer, and the sizes of the particles of the powders of the examples were measured by means of images obtained with a Zeiss® LEO 1530 scanning electron microscope.

Comparative Example 1

0.4363 g of lithium sulfide and 1.0635 g of titanium sulfide are placed in a zirconia jar having a volume of 50 ml and containing 285 zirconia balls having a diameter equal to 5 mm. No solvent is added. The jar is then closed by means of a lid and mounted on a Retsch® PM 100 planetary ball mill. The bowl is loaded and unloaded in an argon-filled glovebox. The milling is then carried out for a duration of 20 hours, the speed of rotation of the mill being set at 510 revolutions per minute.

A powder of $Li_2TiS_3$ particles is thus obtained.

In a glovebox under an argon atmosphere, a composition is then prepared comprising, in percentages by weight, 10% of Super P C65 carbon sold by TIMCAL, 10% of polyvinylidene difluoride (PVDF) as binder, and 80% of the powder of $Li_2TiS_3$ particles. 0.400 ml of N-methyl-2-pyrrolidone (NMP) is added to the composition. The composition is then mixed for 5 minutes at 25° C. An ink is thus obtained. A 100 µm thickness of the ink is coated, using a blade, on an aluminum strip coated with a Teflon® substrate. The ink is dried under an argon atmosphere for 48 hours. An electrode is then cut from the aluminum strip covered with the ink that has dried. The electrode is then pressed under a pressure of 100 kN, cut in the shape of a pellet having a diameter of 14 mm, then is dried under vacuum at 60° C. for 48 hours.

A battery that is in the form of a CR2032 format button cell is manufactured and comprises the electrode forming the cathode and a lithium metal (Li) counter-electrode forming the anode. A separator in the form of a pellet having a diameter of 16 mm, consisting of a Viledon FS 2207-2-DA WA membrane and a Celgard 2400 membrane, is positioned between the electrode and the counter-electrode. The electrode, counter-electrode and separator are immersed in a volume of 150 µl of an LP100 liquid electrolyte consisting of a solvent formed, by volume, of one part of ethyl carbonate, of one part of propylene carbonate and of three parts of dimethyl carbonate, in which a lithium hexafluorophosphate ($LiPF_6$) salt is dissolved to a concentration of 1 mol/l. The battery is subjected to 15 cycles formed of a galvanostatic charge followed by a galvanostatic discharge, imposed at 25° C. between a potential of 1.8 V and 3.0 V vs $Li^+/Li$ at a rate of C/10.

The battery cycling system is of Arbin Instruments® brand.

Example 2

0.336 g of lithium sulfide, 0.410 g of titanium sulfide, 0.175 g of titanium and 0.578 g of selenium are placed in a zirconia jar having a volume of 50 ml and containing 285 zirconia balls having a diameter equal to 5 mm. Hexane of high purity (greater than 99.9%) is poured into the jar until the zirconia balls are covered. The jar is then closed by means of a lid and mounted on a Retsch® PM 100 planetary ball mill. The mill is positioned in an argon-filled glovebox. The milling is then carried out for a duration of 20 hours, the speed of rotation of the mill being set at 510 revolutions per minute.

A powder of $Li_2TiSeS_2$ particles is thus obtained.

An electrode and a battery are manufactured according to the same procedure as that described in example 1, replacing the powder from example 1 with the powder from example 2.

Example 3

0.274 g of lithium sulfide, 0.285 g of titanium and 0.940 g of selenium are placed in a zirconia jar having a volume of 50 ml and containing 285 zirconia balls having a diameter equal to 5 mm. Hexane of high purity (greater than 99.9%) is poured into the jar until the zirconia balls are covered. The jar is then closed by means of a lid and mounted on a Retsch® PM 100 planetary ball mill. The bowl is loaded and unloaded in an argon-filled glovebox. The milling is then carried out for a duration of 20 hours, the speed of rotation of the mill being set at 510 revolutions per minute.

A powder of $Li_2TiSe_2S$ particles is thus obtained.

An electrode and a battery are manufactured according to the same procedure as that described in example 1, replacing the powder from example 1 with the powder from example 3.

X-ray diffraction analyses of the $Li_2TiS_3$, $Li_2TiSeS_2$ and $Li_2TiSe_2S$ powders confirmed that the constituent materials of these powders have an NaCl-type crystallographic structure, as is confirmed by the respective diffractograms 5, 10 and 15 represented in FIG. 1.

A shift of the main diffraction peaks 20, 25 and 30 is observed at small angles with an increase in the amount of selenium in the structure. It is linked to the fact that selenium has an ionic radius equal to 198 Å, greater than that of sulfur, equal to 184 Å. For this same reason, the lattice parameter increases with an increase in the stoichiometric coefficient of selenium, as observed in table 1. Lastly, the shift of the main peaks is greater as the stoichiometric coefficient of the selenium increases.

TABLE 1

| Example | Material | Lattice parameter (Å) |
|---------|----------|----------------------|
| 1 | $Li_2TiS_3$ | 5.0803 |
| 2 | $Li_2TiSeS_2$ | 5.1671 |
| 3 | $Li_2TiSe_2S$ | 5.2516 |

Furthermore, as is seen in FIG. 2, the $Li_2TiS_3$ particles 35 predominantly have a substantially spherical shape with a size of less than 500 nm and form agglomerates 40.

As seen in FIGS. 3 and 4 respectively, the $Li_2TiSeS_2$ particles 50 and the $Li_2TiSe_2S$ particles 55 may have a different shape from the $Li_2TiS_3$ particles. In particular, they may have a platelet shape, with a size of the order of a micron.

FIG. 5 represents the evolution, during the first charge-discharge cycle, of the potential 60 of the positive electrode comprising the material of formula $Li_2TiSeS_2$ as a function of the specific capacity 65 of the material. During the charge 70, $Li^+$ ions are extracted and are deposited on the negative electrode, so that a material of formula $Li_{a'}TiSeS_2$ (with a'<2) is formed. During the discharge 75, the reverse redox reactions occur. A greater specific capacity of around 250 mAh/g is obtained.

FIG. 6 represents, for the batteries from examples 1 to 3, the respective evolution 81, 86 and 91 of the capacity retention 110, expressed in percent, as a function of the number of cycles 115. The capacity retention corresponds to the ratio of the reversible capacity measured at the end of discharge of a charge/discharge cycle to the reversible capacity measured at the end of discharge at the first cycle.

As is known from the prior art, the retention capacity 81 of the battery from example 1, based on $Li_2TiS_3$, decreases rapidly as a function of the number of cycles. It is only 80% at the tenth cycle and 71% at the fifteenth cycle.

The batteries from examples 2 and 3 respectively each have a more stable behavior than the battery from example 1, characterized by a higher capacity retention. The retention capacity 91 of the battery based on $Li_2TiSe_2S$ from example 3 is greater than 90% at the tenth cycle and 75% at the fifteenth cycle. The battery from example 2, based on $Li_2TiSeS_2$ has the most stable charge/discharge behavior and is preferred. It has a retention capacity 86 of greater than 95% at the tenth cycle and greater than 90% at the fifteenth cycle.

FIG. 7 illustrates the evolution during a charge followed by a discharge, of the the potential 120 as a function of the stoichiometric coefficient x of the lithium 125 of a material of formula of formula $Li_xTiSe_2S$.

The material from example 3 (x=2) is initially placed as electrode opposite a lithium counter-electrode. During the charge 130, lithium is gradually extracted from the material until the stoichiometric coefficient x reaches a value of the order of 0.7 for a potential equal to 3 V. The discharge 135 is then carried out, and lithium is then introduced into the material. A stoichiometric coefficient x equal to 4.17 is thus obtained at the end of discharge for a potential equal to 1.5 V.

Of course, the invention is not limited to the embodiments of the product and to the methods of implementation of the process presented in the present description.

Furthermore, unless otherwise indicated, an inequality of the type "A less than B", also expressed as "A<B", is considered strictly. This also applies to an inequality of the type "A greater than B" also expressed as "A>B". In other words, equality between A and B is excluded.

The invention claimed is:

1. A material of formula $Li_aTi_b(A_xS_{3-x})_c$ wherein A is a metalloid element chosen from selenium, tellurium and mixtures thereof, and the stoichiometric coefficients a, b, c and x are such that
0<x<2.2;
0.4≤a≤4.5;
0.9≤b≤1.1; and
0.9≤c≤1.1.

2. The material according to claim 1, wherein the metalloid element A is selenium.

3. The material according to claim 1, wherein the stoichiometric coefficient x is less than or equal to 1.2.

4. The material according to claim 1, wherein the stoichiometric coefficient x is equal to 1.

5. The material according to claim 1, wherein the stoichiometric coefficient a is equal to 2 and/or the stoichiometric coefficient b is equal to 1 and/or the stoichiometric coefficient c is equal to 1.

6. The material according to claim 5, wherein the stoichiometric coefficient a is equal to 2 and the stoichiometric coefficient b is equal to 1 and the stoichiometric coefficient c is equal to 1.

7. The material according to claim 1, having an NaCl-type crystallographic structure.

8. The material according to claim 1, having a maximum reversible capacity of greater than 200 $mAh \cdot g^{-1}$.

9. The material according to claim 8, having a maximum reversible capacity of greater than 230 $mAh \cdot g^{-1}$.

10. A powder comprising particles formed of the material according to claim 1.

11. A battery cathode comprising the material according to claim 1.

12. A battery comprising a battery cathode according to claim 11.

13. The battery according to claim 12, chosen from the group consisting of a lithium-ion battery and a lithium battery.

14. A lithium-ion battery according to claim 13, having a capacity retention at fifteen cycles of greater than or equal to 75%.

15. The lithium-ion battery according to claim 14, having a capacity retention at fifteen cycles of greater than or equal to 85%.

16. The lithium-ion battery according to claim 15, having a capacity retention at fifteen cycles of greater than or equal to 90%.

17. A process for manufacturing a material according to claim 1, comprising a step of milling raw materials, the raw materials being chosen so as to obtain, at the end of the milling step, the material according to claim 1.

18. The process according to claim 17, wherein the raw materials comprise a powder of titanium particles, a powder of selenium particles.

19. The process according to claim 18, wherein the raw materials further comprise a powder of lithium sulfide particles.

20. The process according to claim 17, the milling step being carried out in a wet environment in a solvent.

21. The process according to claim 20, the solvent being hexane.

22. The process according to claim 21, the purity of the solvent being greater than 99.5%.

23. The process according to claim 17, the milling step being carried out in a reducing atmosphere.

24. The process according to claim 17, the milling step being carried out in an inert atmosphere.

* * * * *